United States Patent
Liu et al.

(10) Patent No.: US 7,885,546 B2
(45) Date of Patent: Feb. 8, 2011

(54) METHOD AND APPARATUS FOR TRANSPARENT ETHERNET MULTIPLEXING AND DEMULTIPLEXING

(75) Inventors: Samuel Liu, San Jose, CA (US);
Xiaodong Duan, Fremont, CA (US);
Giovanni Barbarossa, Saratoga, CA (US)

(73) Assignee: Oclaro (North America), Inc., San Jose, CA (US)

( * ) Notice: Subject to any disclaimer, the term of this patent is extended or adjusted under 35 U.S.C. 154(b) by 672 days.

(21) Appl. No.: 11/877,621

(22) Filed: Oct. 23, 2007

(65) Prior Publication Data

US 2009/0103920 A1    Apr. 23, 2009

(51) Int. Cl.
*H04J 14/08* (2006.01)
(52) U.S. Cl. ........................................ 398/98
(58) Field of Classification Search ............ 398/98
See application file for complete search history.

(56) References Cited

U.S. PATENT DOCUMENTS 7,483,432 B2 *   1/2009   Nuss et al. .............. 370/395.3

2006/0062581 A1   3/2006   Liu et al.

\* cited by examiner

*Primary Examiner*—Leslie Pascal
(74) *Attorney, Agent, or Firm*—Patterson & Sheridan, L.L.P.

(57) ABSTRACT

A method and apparatus for multiplexing multiple Ethernet-based data streams in an optical network reduce the number of optical transceivers required by the optical network. Multiple data streams are multiplexed into a combined data stream, transmitted from a node in the optical network as the combined data stream, and demultiplexed at the receiving node. Data streams are multiplexed and demultiplexed at the bit level, and packets from each data stream are routed based on a VLAN tag that is contained in the header of each packet. By transmitting the information contained in multiple data streams as a single multiplexed data stream, the number of optical transceivers required for the optical network may be reduced by more than half. An optical supervisory channel may also be bundled with one of the data streams to eliminate the need for a dedicated transceiver for the optical supervisory channel.

20 Claims, 6 Drawing Sheets

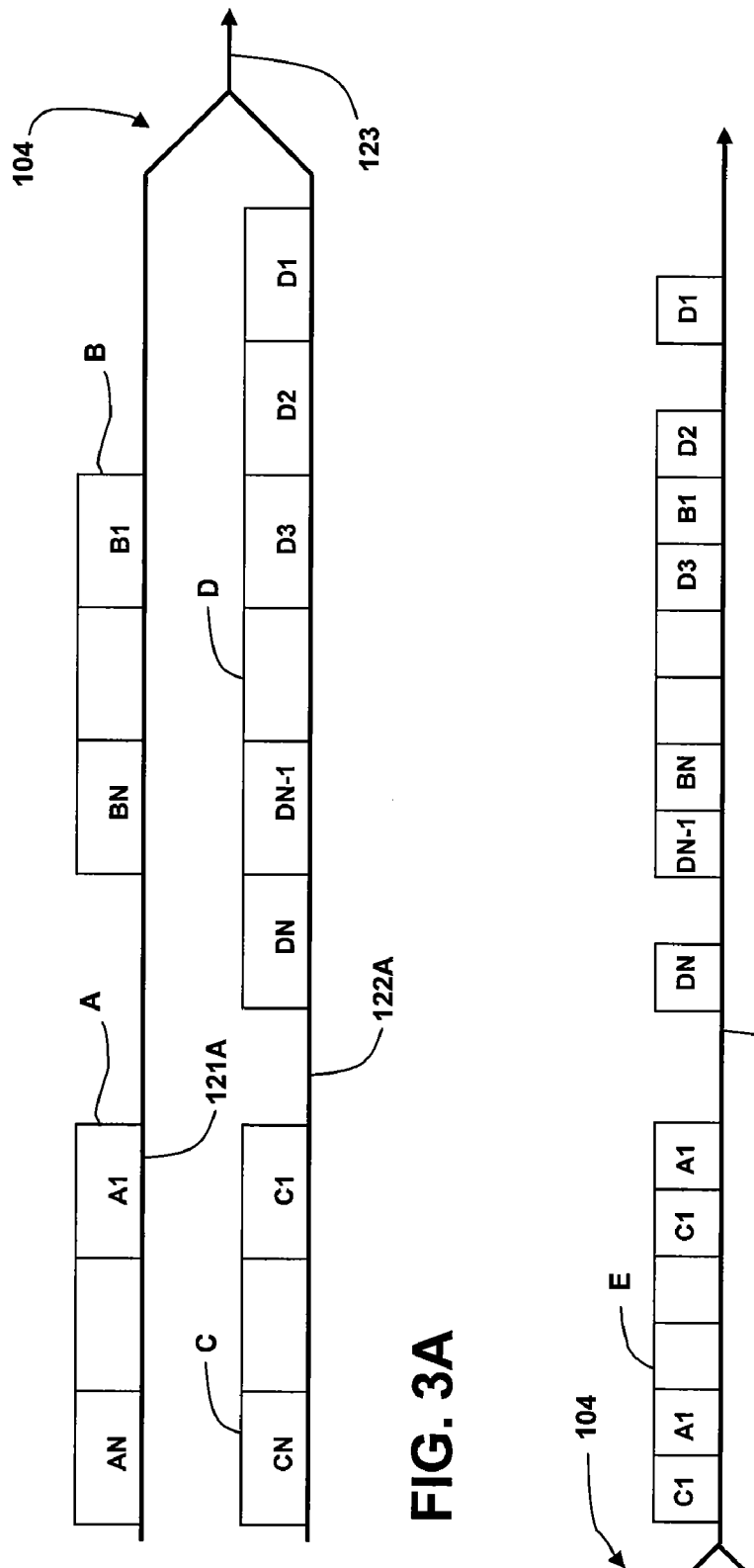

METHOD AND APPARATUS FOR TRANSPARENT ETHERNET MULTIPLEXING AND DEMULTIPLEXING

BACKGROUND OF THE INVENTION

1. Field of the Invention

Embodiments of the present invention relate generally to optical communication systems and, more particularly, to transport of data in Ethernet-based optical communication systems.

2. Description of the Related Art

As utilization of optical communication networks increases, there is an ongoing effort to increase network transport efficiency, i.e., data transfer rate of the network, while lowering the per-bit cost of data transport. One approach for enhancing network transport efficiency is to transmit data at higher speeds, or bit rates. In this way, the effective bandwidth of an available fiber optic infrastructure is increased without installing additional optical fibers or links, thereby realizing substantial cost savings.

However, other components of optical communication networks become increasingly expensive when designed for higher bit rates, particularly at bit rates equal to or greater than about 2 Gbps. One such component is the optical transceiver, one example of which is the small form-factor pluggable (SFP) transceiver. Optical transceivers interface a network switch, router, or similar device to a fiber optic networking cable, where one optical transceiver is required for each channel transmitted over the fiber optic cable. Because wavelength-division multiplexing (WDM) systems are envisioned to have a large number of channels, i.e., 50 or more, the cost of optical transceivers makes up a substantial portion of the cost of a modern optical communications network. Hence, the added cost of higher speed optical transceivers can partially negate the cost savings associated with upgrading an optical communications network to a higher bit rate.

Accordingly, there is a need in the art for a low-cost data transport solution for Ethernet-based optical communications systems operating at 2 Gbps and faster.

SUMMARY OF THE INVENTION

Embodiments of the present invention provide a method and apparatus for the high-speed, low-cost transport of Ethernet-formatted data streams by reducing the number of transceivers necessary for the operation of an optical network.

A method of transporting packets carried on Ethernet channels over an optical communication network, according to one embodiment, comprises the steps of marking packets carried on a first Ethernet channel with a first tag, marking packets carried on a second Ethernet channel with a second tag, multiplexing the packets marked with the first tag and the packets marked with the second tag to form a multiplexed data stream, and converting the multiplexed data stream into an optical signal and transmitting the optical signal over the optical communication network. The first and second tags may comprise VLAN tags, and the packets marked with the first tag and the packets marked with the second tag may be multiplexed by the process of bit level interleaving According to another embodiment, a method of generating packets to be carried on Ethernet channels from an optical signal received over an optical communication network comprises the steps of converting the optical signal received over the optical communication network into a data stream, demultiplexing the data stream into first and second streams of packets, and examining a header of each packet in the first and second steams of packets and directing said each packet to a first Ethernet channel if the header contains a first tag and to a second Ethernet channel if the header contains a second tag.

In another embodiment, an Ethernet data transport system comprises an Ethernet switch configured to mark packets carried on a first Ethernet channel with a first tag and mark packets carried on a second Ethernet channel with a second tag, a multiplexer coupled to the Ethernet switch and configured to interleave the packets marked with the first tag and the packets marked with the second tag at the bit level to form a combined data stream, and an optical transceiver coupled to the multiplexer and configured to convert the combined data stream into an optical output signal.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 3A depicts packets contained in two data streams prior to multiplexing the data streams into a combined data stream.

FIG. 3B depicts the packets illustrated in FIG. 3A after the two data streams have been multiplexed into a combined data stream.

For clarity, identical reference numbers have been used, where applicable, to designate identical elements that are common between figures. It is contemplated that features of one embodiment may be incorporated in other embodiments without further recitation.

DETAILED DESCRIPTION

Embodiments of the invention contemplate a method and apparatus for multiplexing multiple Ethernet data streams in an optical network to reduce the number of optical transceivers required by the optical network. Multiple data streams, or channels, are multiplexed into a combined data stream, transmitted from one node to another in the optical network as the combined data stream, and demultiplexed into multiple output channels at the receiving node. Channels are multiplexed and demultiplexed at the bit level, and packets from each channel are directed based on a VLAN tag that is inserted into the header of each packet. By transmitting the information contained in multiple channels as a single multiplexed data stream, the number of optical transceivers required for the optical network may be reduced by half or more.

Bit-level interleaving of data streams is known in the art for synchronized transport of data, such as synchronous optical networking (SONET). However, bit interleaving for Ethernet data streams is inherently more difficult than for synchronized data transport systems. This is because the packets for synchronized transport of data streams are of fixed length and form a continuous stream of bits. Therefore, after mixing, the bits making up one interleaved data stream are synchronized with the bits making up one or more other data streams. In this way, the time-position of each bit in a combined data stream is based on which data stream each bit originated from. Because of this, the bits making up different interleaved channels can be routed to the correct channel after demultiplexing.

In contrast, Ethernet data streams are made up of variable length packets that are separated by variable time intervals. Due to this asynchronous feature of Ethernet data streams, packets from a particular channel can arrive at a multiplexer at any time. Therefore, unlike packets of synchronized data transport systems, an Ethernet packet cannot be routed to the correct channel after demultiplexing based on the arrival time of the packet at the multiplexer or demultiplexer. In addition, at the bit level there is no tag or other identifying information indicating to which channel a given bit should be routed after demultiplexing. Thus, after demultiplexing an Ethernet data stream, reassembled packets may be routed to any receiving channel and not necessarily to the receiving channel corresponding to the transmitting channel for each packet.

In the embodiments of the invention, a VLAN tag is inserted into the header of each packet prior to multiplexing two or more data streams to allow the proper routing of each reassembled packet after demultiplexing. An Ethernet switch located at a transmitting node inserts the VLAN tag, and an Ethernet switch located at the corresponding receiving node reads the VLAN tag and performs the routing of each packet to the appropriate output channel based on this VLAN tag.

Figure 1:
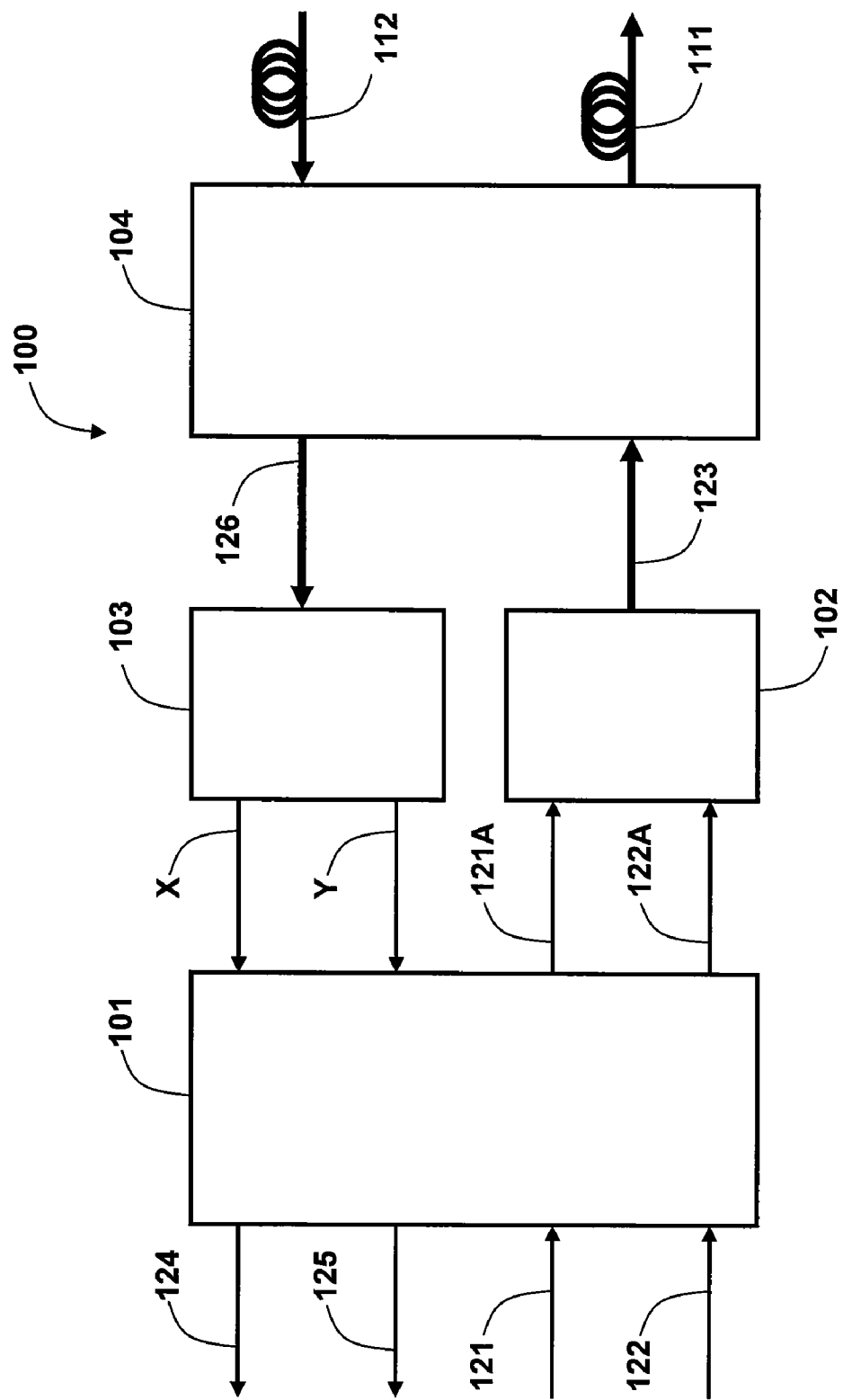
FIG. 1 schematically illustrates a data transport system, according to an embodiment of the invention.

FIG. 1 schematically illustrates a data transport system 100, according to an embodiment of the invention. Data transport system 100 is located at a node of an optical communications network, and includes an Ethernet switch 101, a multiplexer 102, a demultiplexer 103, an optical transceiver 104, and transmission lines 111, 112. In the example illustrated in FIG. 1, data transport system 100 is configured to multiplex two input channels 121, 122 into a single channel, i.e., combined channel 123, and to transmit combined channel 123 via transmission line 111 to other locations of the optical communications network. Input channels 121, 122 are each 1 Gigabit Ethernet (GbE) channels, and combined channel 123 is a 2.0 to 2.5 GbE channel. Data transport system 100 is also configured to receive combined channel 126 via transmission line 112 and to demultiplex combined channel 126 into output channels 124, 125, where combined channel 126 is a 2.0 to 2.5 GbE channel and output channels 124, 125 are each 1 GbE channels. Transmission lines 111, 112 optically link data transport system 100 to other data transport systems, which are also located at nodes of the optical communication network and are substantially similar to data transport system 100 in organization and operation.

Ethernet switch 101 is an 8-port Ethernet switch and is configured to receive and transmit multiple Ethernet data streams via a non-optical medium, such as a twisted pair networking cable or an unshielded twisted pair (UTP). The Ethernet data streams received by Ethernet switch 101 include input channels 121, 122 and demultiplexed channels X, Y. Ethernet data streams transmitted by Ethernet switch 101 include output channels 124, 125 and tagged channels 121A, 122A. Ethernet switch 101 is configured to insert a virtual LAN (VLAN) tag into the header of each packet carried by input channels 121, 122, thereby producing tagged channels 121A, 122A. The inserted VLAN tag indicates the originating channel of each packet, i.e., input channel 121 or 122, thereby allowing correct routing of each packet after demultiplexing. Ethernet switch 101 is further configured to route tagged channels 121A, 122A to multiplexer 102. Lastly, Ethernet switch 101 is configured to receive demultiplexed channels X, Y from demultiplexer 103, and to direct each packet contained therein to output channel 124 or 125. Ethernet switch 101 directs packets from demultiplexed channels X, Y based on a VLAN tag contained in the packet header. The VLAN tag insertion and multiplexing occurs in a second data transport system, located at the distal end of transmission line 112. VLAN tag insertion, routing of Ethernet signals, and directing of packets based on packet headers are all methods commonly known in the art for Ethernet switches and are not described herein.

Multiplexer 102 couples Ethernet switch 101 and optical transceiver 104, and is configured to interleave tagged channels 121A, 122A at the bit level, thereby producing combined channel 123. Bit interleaving of tagged channels 121A, 122A is described below in conjunction with FIGS. 3A and 3B. Tagged channels 121A, 122A are each 1 GbE channels. In order for multiplexer 102 to multiplex the data contained therein into a single data stream, i.e., combined channel 123, the output stream must have a bit rate equal to or greater than the combined bit rate of tagged channels 121A, 122A. In the example illustrated in FIG. 1, combined channel 123 is a 2.5 GbE channel. Hence, multiplexer 102 combines two separate digital data streams, i.e., tagged channels 121A, 122A, into one data stream of a higher data rate, i.e., combined channel 123.

Optical transceiver 104 optically links data transport system 100, via transmission lines 111, 112, with the greater optical network of which data transport system 100 is a part. In this example, optical transceiver 104 is an SFP transceiver with a bit rate of 2.5 Gbps. Optical transceiver 104 is configured to receive a 2.5 Gbps electrical signal from a non-optical medium, such as a UTP cable, convert the signal to an optical signal, and transmit the optical signal over an optical waveguide, such as an optical fiber. Optical transceiver 104 is further configured to receive a 2.5 Gbps optical signal from an optical waveguide, convert the optical signal to an electrical signal, and transmit the electrical signal over a non-optical medium.

Because tagged channels 121A, 122A, are multiplexed into a single data stream, only a single optical transceiver is required to link data transport system 100 to its greater optical network. Since other nodes of the greater optical network are understood to be configured in a similar manner in this embodiment, the total number of optical transceivers required for the optical network can be reduced by half, thereby realizing substantial savings in the total network cost. In addition, for WDM-based optical communication networks, which may have up to 50 or more channels, each node may include a plurality of data transport systems substantially similar to data transport system 100, further compounding the reduction in total network cost. For example, for a WDM optical network operating with 50 channels at 1 GbE, each node thereof may include 25 data transport systems substantially similar to data transport system 100. In this case, the optical network requires 25 fewer optical transceivers per node than in the prior art.

Transmission lines 111, 112 are fiber optic cables well known in the art. Due to the bi-directional nature of fiber optic cables, a single fiber optic network cable may perform the functions of transmission lines 111, 112.

Similar to multiplexer 102, demultiplexer 103 couples Ethernet switch 101 and optical transceiver 104. Demultiplexer 103 is configured to separate two interleaved data streams from a combined data stream, i.e., combined channel 126. The data streams contained in combined channel 126 have been multiplexed by a data transport system that is substantially similar to data transport system 100 and is located at another node of the greater optical network. The demultiplexing of combined channel 126 takes place at the bit level to produce demultiplexed channels X, Y, as indicated in FIG. 1. Bit level demultiplexing, according to embodiments of the invention, is described below in conjunction with FIGS. 1C and 1D.

Alternatively, embodiments of the invention contemplate a data transport system substantially similar to data transport system 100, but configured to multiplex three or more input channels and to demultiplex an equal number of output channels. In this way, the number of optical transceivers required by the greater optical network is further reduced. For example, in an embodiment configured to multiplex/demultiplex four data streams into/out of a higher speed data stream, the total number of optical transceivers required by the optical network is one quarter that required by a prior art optical network of similar capability. In such an embodiment, the bit rate of combined channel 123 and the bit rate of optical transceiver 104 must be equal to or greater than the combined bit rates of all tagged channels multiplexed by multiplexer 102.

Figure 2:
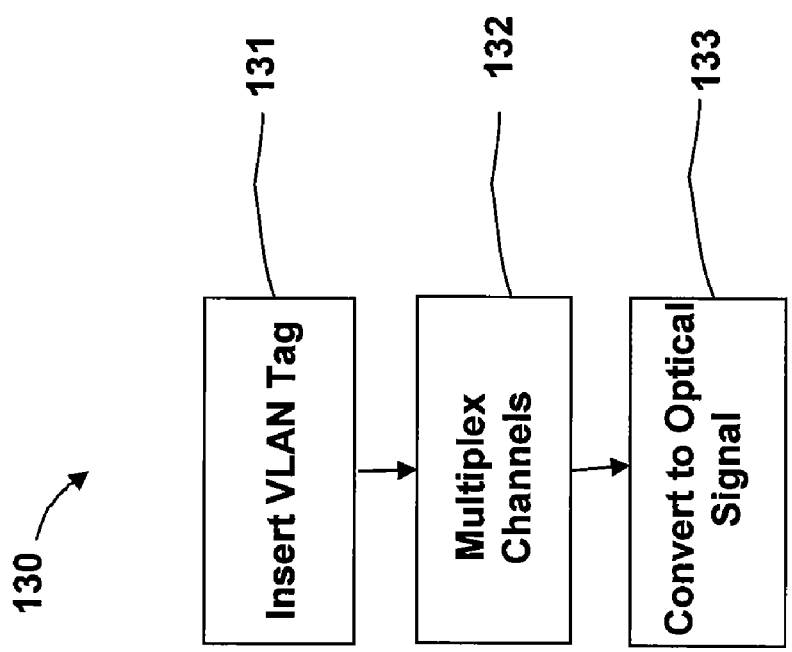
FIG. 2 is a flow chart summarizing an operating sequence for a data transport system, according to an embodiment of the invention.

FIG. 2 is a flow chart summarizing an operating sequence 130 for data transport system 100, according to an embodiment of the invention. Operating sequence 130 describes the operation of data transport system 100 when receiving and multiplexing two non-optical data streams and transmitting a multiplexed optical data stream between nodes of an optical network.

In step 131, Ethernet switch 101 receives input channels 121, 122 and inserts a VLAN tag into the header of each packet, producing tagged channels 121A, 122A. In this embodiment, input channels 121, 122 and tagged channels 121A, 122A are all 1 GbE signals. As noted above, the VLAN tag inserted into the header of each packet indicates from which input channel the packet originated, so that each packet can later be routed to the correct channel after demultiplexing. After VLAN tag insertion, tagged channels 121A, 122A are routed to multiplexer 102.

In step 132, multiplexer 102 interleaves tagged channels 121A, 122A at the bit level, producing combined channel 123, which is a 2.5 GbE channel. The bit-level interleaving of tagged channels 121A, 122A into combined channel 123, according to one embodiment of the invention, is schematically illustrated in FIGS. 1C, 1D.

FIG. 3A depicts packets contained in tagged channels 121A, 122A prior to multiplexing into combined channel 123. Packets A, B are contained in tagged channel 121A and packets C, D are contained in tagged channel 122A. Packets A, B, C, and D include a plurality of bits A1-AN, B1-BN, C1-CN, and D1-DN, respectively. The horizontal position of each bit relative to multiplexer 102 corresponds to the order in which each bit is received thereby, where the bits of each packet proximal to multiplexer 102, i.e., bits A1, B1, C1 and D1, are the first to be processed by multiplexer 102. As depicted in FIG. 3A, packets A and C will be received by multiplexer 102 at substantially the same time, and the first bits of packet D will be reach multiplexer 102 prior to the bits of packet B.

FIG. 3B depicts packets A-D after tagged channels 121A, 122A have been multiplexed into combined channel 123. Bits entering multiplexer 102 from tagged channel 121A are interleaved with bits entering multiplexer 102 from tagged channel 122A, as indicated. Because the bit rate of combined channel 123 is faster than the bit rate of tagged channels 121A, 122A, bits contained in combined channel 123 are of a proportionately smaller duration relative to bits contained in tagged channels 121A, 122A. Multiplexer 102 interleaves the bits of these packets as they are received, alternating between packets when bits from two packets enter multiplexer 102 simultaneously.

Referring back to FIG. 2, in step 133, optical transceiver 104 receives combined channel 123, converts combined channel 123 to a 2.5 Gbps optical signal, and transmits the optical signal to another node in the optical network via transmission line 111.

Figure 4:
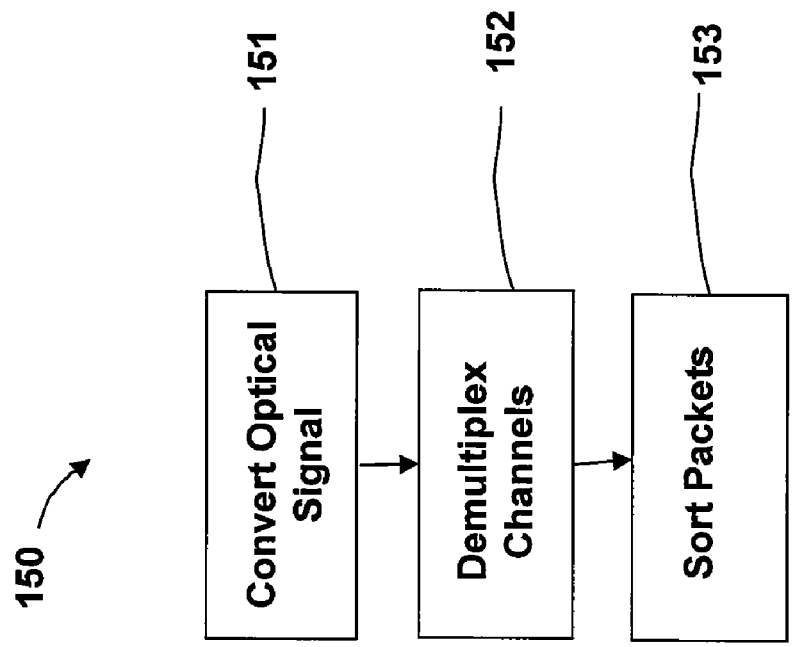
FIG. 4 is a flow chart summarizing an operating sequence for a data transport system, according to an embodiment of the invention.

FIG. 4 is a flow chart summarizing an operating sequence 150 for data transport system 100, according to an embodiment of the invention. Operating sequence 150 describes the operation of data transport system 100 when receiving a multiplexed optical data stream, demultiplexing the optical data stream into two non-optical data streams, and routing the packets making up the non-optical data streams to the correct output port.

In step 151, optical transceiver 104 receives a 2.5 Gbps optical signal from another node in the optical network via transmission line 112, converts the optical signal into combined channel 126, and transmits combined channel 126 to demultiplexer 103.

In step 152, demultiplexer 103 demultiplexes combined channel 126 at the bit level, producing demultiplexed channels X, Y, each of which is a 1.0 GbE channel. The bit-level demultiplexing of combined channel 126 into demultiplexed channels X and Y, according to one embodiment of the invention, is schematically illustrated in FIGS. 5A and 5B.

Figure 5A:
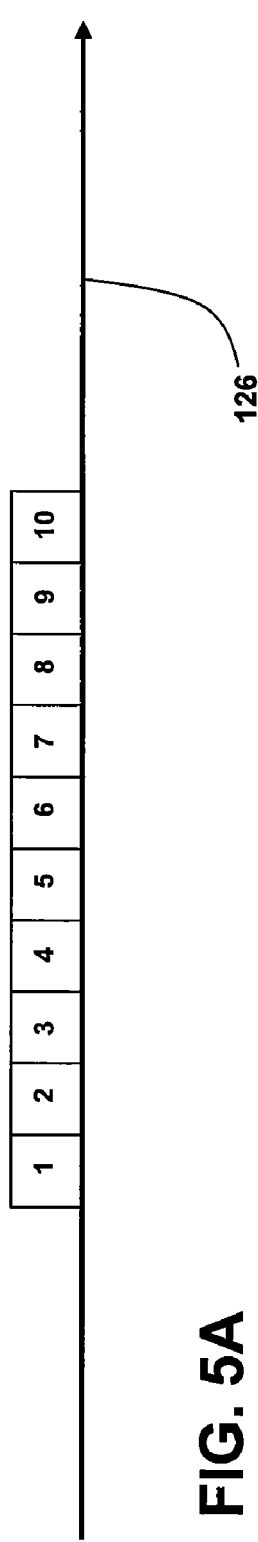
FIG. 5A depicts a series of bits contained in a combined data stream prior to demultiplexing into two data streams.
Figure 5B:
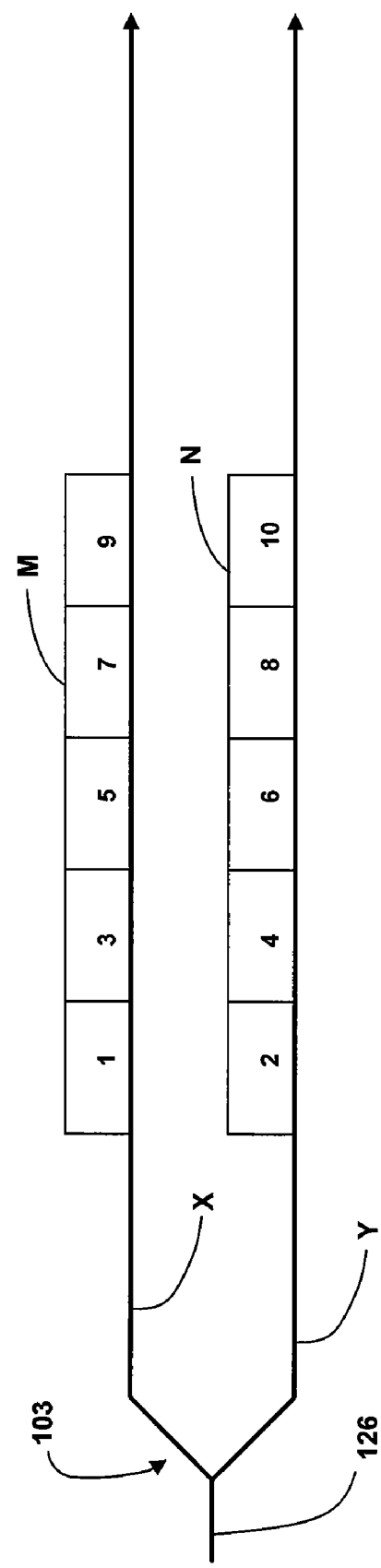
FIG. 5B depicts packets contained in two demultiplexed data streams after demultiplexing from a combined data stream.

FIG. 5A depicts bits 1-10 contained in combined channel 126 prior to demultiplexing into demultiplexed channels X and Y, and FIG. 5B depicts bits 1-10 in demultiplexed channels X, Y after demultiplexing from combined channel 126 by demultiplexer 103. As shown, bits 1-10 are alternately separated into either packet M, which is carried by demultiplexed channel X, or into packet N, which is carried by demultiplexed channel Y. Packets M and N each correspond to a packet transmitted from an adjacent node and originating from a first or second input channel, where the information contained in packet M is from one input channel of the transmitting node and the information from packet N is from the other input channel of the transmitting node. Due to the asynchronous nature of Ethernet-formatted data streams, the use of bit level demultiplexing means that packet M may originate from the first input channel and packet N may originate from the second input channel, or vice versa. Hence, packets directed to demultiplexed channel X may carry packets from either of the transmitting node input channels. Similarly, packets directed to demultiplexed channel Y may also carry packets from either of the transmitting node input channels.

In step 153, Ethernet switch 101 receives demultiplexed channels X, Y, each of which may contain packets from data streams that have been multiplexed into combined channel 126 at the transmitting node (not shown). Ethernet switch 101 directs each packet to either output channel 124 or 125, based on the VLAN tag assigned each packet. In this way, the two data streams multiplexed into combined channel 126 are each reconstructed and routed to the desired output channel. For example, packets originating from tagged channel 121A at the transmitting node are always directed to output channel 125 of the receiving node and packets originating from tagged channel 122A at the transmitting node are always directed to output channel 124 of the receiving node.

Embodiments of the invention contemplate a method and apparatus for further reducing the number of optical transceivers required in an optical network by interleaving an optical supervisory channel (OSC) into a data stream. In this embodiment, the OSC is bundled with a data stream, such as a GbE channel, at the packet level. This packet-level bundling takes place prior to multiplexing of the conventional data stream with one or more other data streams. Because an OSC typically operates at a low bit rate relative to conventional data streams, e.g., 10 Mbps vs. 1 Gbps, interspersing OSC packets into such a data stream does not require a speed increase for the data stream. By bundling OSC packets with one of the data channels of an optical network, e.g., input channel 121 or 122, a dedicated optical transceiver for converting the OSC to an optical signal is not required. The OSC and the data stream with which it is bundled are converted to an optical signal simultaneously.

Figure 6:
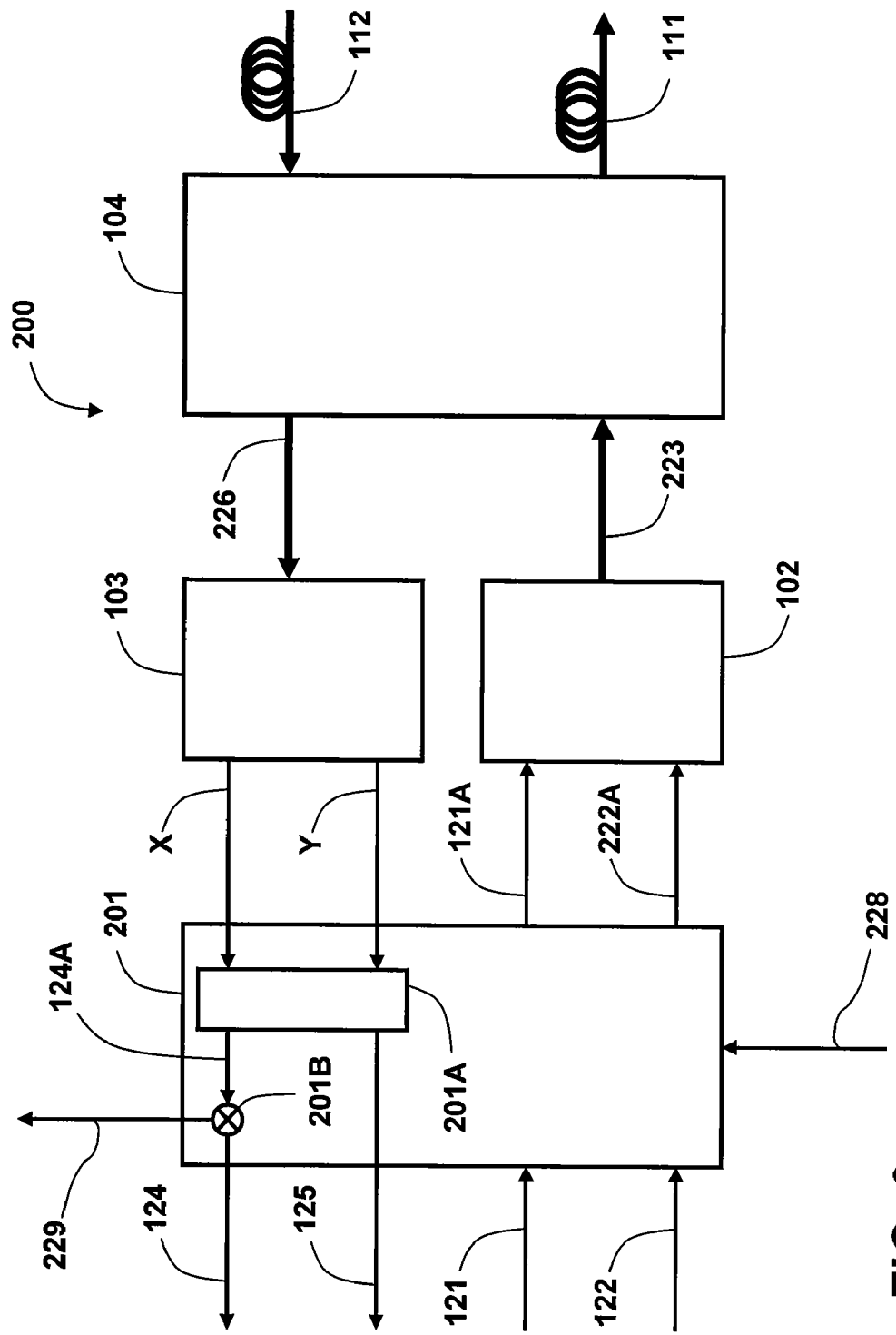
FIG. 6 schematically illustrates a data transport system configured to bundle an OSC with an information-carrying channel of an optical network, according to an embodiment of the invention

FIG. 6 schematically illustrates a data transport system 200 configured to bundle an OSC with a data channel of an optical network, according to an embodiment of the invention. Data transport system 200 is substantially similar in organization and operation to data transport system 100 in FIG. 1. Identical reference numbers have been used, where applicable, to designate common elements between data transport systems 100 and 200.

As shown in FIG. 6, data transport system 200 is located at a node of an optical communications network, and includes 10-port Ethernet switch 201, a multiplexer 102, demultiplexer 103, optical transceiver 104, and transmission lines 111, 112. Data transport system 200 is configured to multiplex two input channels and an OSC into a combined channel, and to transmit the combined channel as an optical signal to an adjacent network node. Data transport system 200 is also configured to receive a combined channel as an optical signal from an adjacent network node, and to demultiplex the combined channel into two output channels and an OSC.

An OSC 228 transmits information required to manage the optical link between nodes of an optical communications network and is commonly known and used in the art. Ordinarily, a dedicated optical transceiver is required to convert OSC 228 to an optical signal for transmission between nodes.

10-port Ethernet switch 201 is substantially similar in organization and operation to Ethernet switch 101 in FIG. 1. 10-port Ethernet switch 201 is also configured to bundle information contained in OSC 228 with input channel 122, to form a tagged channel 222A, where the combination of OSC 228 with input channel 122 takes place at the packet level. 10-port Ethernet switch 201 is further configured to route OSC packets received from demultiplexer 103 to OSC output 229. 10-port Ethernet switch 201 differentiates OSC packets from data packets based on information already included in each packet header. In one embodiment, 10-port Ethernet switch 201 assigns a VLAN tag to the packets originating from OSC 228, in addition to inserting a VLAN tag in each packet from input channels 121, 122. In the embodiment illustrated in FIG. 1, the VLAN tag for the packets originating from OSC 228 is the same as the VLAN tag for the packets originating from input channel 122. In this way, OSC packets are routed with packets from the same data channel before multiplexing and after multiplexing. This technique is beneficial when it is known that one data channel has more available data-carrying capacity than the other, and therefore is better suited to carry OSC traffic. In this embodiment, switching function 201A of 10-port Ethernet switch 201 directs packets from demultiplexed channels X and Y to either output channel 124A or output channel 125, where output channel 124A consists of OSC packets and packets from a first data channel, and output channel 125 consists of packets from a second data channel. Switching function 201B then directs data packets of output channel 124A to output channel 124, and directs OSC packets of output channel 124A to output channel 229.

Figure 7:
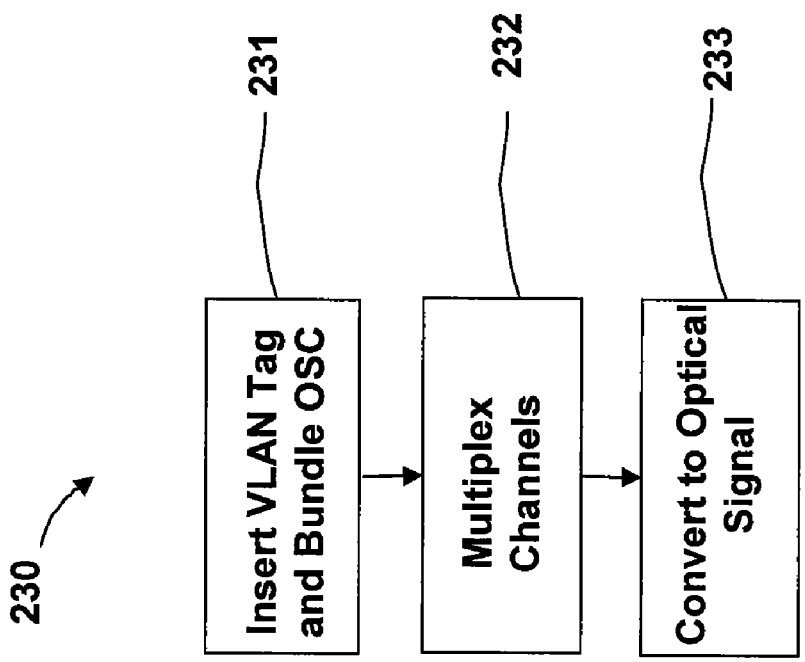
FIG. 7 is a flow chart summarizing an operating sequence for a data transport system, according to an embodiment of the invention.

FIG. 7 is a flow chart summarizing an operating sequence 230 for data transport system 200, according to an embodiment of the invention. Operating sequence 230 describes the operation of data transport system 200 when receiving and multiplexing two non-optical data streams and a non-optical OSC, and transmitting a multiplexed optical data stream to another node.

In step 231, 10-port Ethernet switch 201 receives input channels 121, 122 and OSC 228, and inserts a VLAN tag into the header information of each packet, producing tagged channels 121A, 222A. Tagged channel 222A also includes packets originally from OSC 228. As noted above, the VLAN tag inserted into each packet indicates from which input channel the packet originated so that each packet can later be routed correctly after demultiplexing. Tagged channels 121A, 222A are sent to multiplexer 102.

In step 232, multiplexer 102 interleaves tagged channels 121A, 222A at the bit level, producing combined channel 223, which is a 2.5 GbE channel. The bit-level interleaving of tagged channels 121A, 222A into combined channel 223 is substantially similar to the bit-level interleaving of tagged channels 121A, 122A, described above in conjunction with FIGS. 1C, 1D.

In step 233, optical transceiver 104 receives combined channel 223, converts combined channel 223 to a 2.5 Gbps optical signal, and transmits the optical signal to another node in the optical network via transmission line 111.

Figure 8:
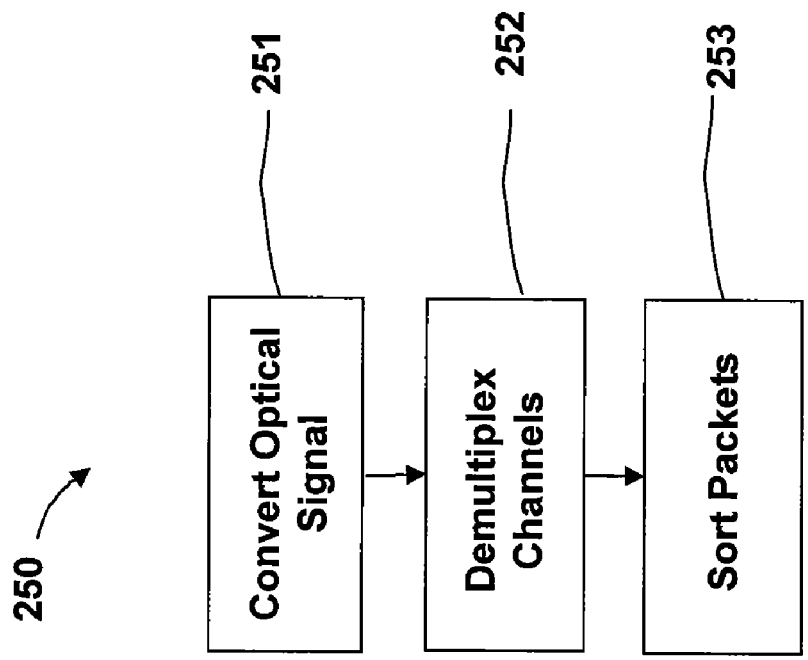
FIG. 8 is a flow chart summarizing an operating sequence for a data transport system, according to an embodiment of the invention.

FIG. 8 is a flow chart summarizing an operating sequence 250 for data transport system 200, according to an embodiment of the invention. Operating sequence 250 describes the operation of data transport system 200 when receiving a multiplexed optical data stream from another node, demultiplexing the optical data stream into two non-optical data streams, and correctly routing the packets making up the non-optical data streams to output channels or to an OSC.

In step 251, optical transceiver 104 receives a 2.5 Gbps optical signal from another node in the optical network via transmission line 112, converts the optical signal into combined channel 226, and transmits combined channel 226 to demultiplexer 103.

In step 252, demultiplexer 103 demultiplexes combined channel 226 at the bit level, producing demultiplexed channels X, Y, each of which is a 1.0 GbE channel. The bit-level demultiplexing of combined channel 226 into demultiplexed channels X, Y, is substantially similar to the bit-level demultiplexing of combined channel 126, described above in conjunction with FIGS. 5A and 5B.

In step 253, 10-port Ethernet switch 201 receives demultiplexed channels X, Y, each of which contain packets from two different data streams and an OSC multiplexed into combined channel 226. 10-port Ethernet switch 201 directs each data stream packet to either output channel 124 or output channel 125, based on the VLAN tag assigned each packet. 10-port Ethernet switch 201 may direct OSC packets to OSC 229 based on other header information. Alternatively, when the OSC packets have been assigned a VLAN tag, 10-port Ethernet switch 201 first directs OSC and data stream packets to either output channel 124A or output channel 125 based on the VLAN tag assigned each packet. 10-port Ethernet switch 201 then directs the data packets of output channel 124A to output channel 124 and OSC packets of output channel 124A to OSC 229.

While the foregoing is directed to embodiments of the present invention, other and further embodiments of the invention may be devised without departing from the basic scope thereof, and the scope thereof is determined by the claims that follow.

We claim:

1. A method of transporting packets carried on Ethernet channels over an optical communication network, the method comprising:
   marking packets carried on a first Ethernet channel with a first tag;
   marking packets carried on a second Ethernet channel with a second tag;
   multiplexing the packets marked with the first tag and the packets marked with the second tag by a process of bit level interleaving to form a multiplexed data stream; and
   converting the multiplexed data stream into an optical signal and transmitting the optical signal over the optical communication network.

2. The method according to claim 1, wherein the first tag is inserted into a header of each of the packets carried on the first Ethernet channel and the second tag is inserted into a header of each of the packets carried on the second Ethernet channel.

3. The method according to claim 2, wherein the first and second tags comprise VLAN tags.

4. The method according to claim 1, wherein the packets marked with the first tag comprise data packets and control packets.

5. The method according to claim 4, further comprising the step of inserting the control packets onto the first Ethernet channel in between the data packets.

6. A method of generating packets to be carried on Ethernet channels from an optical signal received over an optical communication network, the method comprising:
   converting the optical signal received over the optical communication network into a data stream;
   demultiplexing the data stream into first and second streams of packets, wherein the data stream is demultiplexed by a process of bit level de-interleaving; and
   examining a header of each packet in the first and second steams of packets and directing said each packet to a first Ethernet channel if the header contains a first tag and to a second Ethernet channel if the header contains a second tag.

7. The method according to claim 6, wherein the first and second tags comprise VLAN tags.

8. The method according to claim 6, wherein the first and second streams of packets include data packets and control packets.

9. The method according to claim 8, further comprising the step of directing the control packets into a supervisory channel that is different from the first Ethernet channel and the second Ethernet channel.

10. An Ethernet data transport system, comprising:
    an Ethernet switch configured to mark packets carried on a first Ethernet channel with a first tag and mark packets carried on a second Ethernet channel with a second tag;
    a multiplexer coupled to the Ethernet switch and configured to interleave the packets marked with the first tag and the packets marked with the second tag at the bit level to form a combined data stream; and
    an optical transceiver coupled to the multiplexer and configured to convert the combined data stream into an optical output signal.

11. The Ethernet data transport system according to claim 10, further comprising:
    a demultiplexer coupled to the Ethernet switch and the optical transceiver,
    wherein the optical transceiver is further configured to receive an optical input signal and to convert the optical input signal into a data stream, and
    wherein the demultiplexer is configured to de-interleave the data stream converted from the optical input signal at the bit level to form first and second streams of packets, and
    wherein the Ethernet switch is further configured to receive the first and second streams of packets and direct each packet to a third Ethernet channel or a fourth Ethernet channel.

12. The Ethernet data transport system according to claim 11, wherein the packets carried on the first Ethernet channel include data packets and control packets, and the packets directed to the third Ethernet channel include data packets and control packets.

13. The Ethernet data transport system according to claim 12, wherein the control packets comprise optical supervisory channel packets.

14. The Ethernet data transport system according to claim 13, wherein the Ethernet switch comprises means for inserting the control packets onto the first Ethernet channel in between the data packets, and means for directing the control packets in the third Ethernet channel to a supervisory channel.

15. The Ethernet data transport system according to claim 11, wherein the optical transceiver is a small form-factor pluggable (SFP) optical transceiver.

16. The data transfer system of claim 15, wherein the optical transceiver has a bit rate of at least about 2.0 Gbps, and each of the Ethernet channels has a bit rate of about 1.0 Gbps.

17. The Ethernet data transport system according to claim 10, wherein the first and second tags comprise VLAN tags.

18. The Ethernet data transport system according to claim 17, wherein each of the packets comprises a header and the VLAN tag is contained in the header.

19. A method of transporting packets carried on Ethernet channels over an optical communication network, the method comprising:
    marking packets carried on a first Ethernet channel with a first tag, wherein the packets marked with the first tag comprise data packets and control packets;
    inserting the control packets onto the first Ethernet channel in between the data packets;
    marking packets carried on a second Ethernet channel with a second tag;
    multiplexing the packets marked with the first tag and the packets marked with the second tag to form a multiplexed data stream; and
    converting the multiplexed data stream into an optical signal and transmitting the optical signal over the optical communication network.

20. A method of generating packets to be carried on Ethernet channels from an optical signal received over an optical communication network, the method comprising:

converting the optical signal received over the optical communication network into a data stream;

demultiplexing the data stream into first and second streams of packets, wherein the first and second streams of packets include data packets and control packets;

examining a header of each packet in the first and second steams of packets and directing said each packet to a first Ethernet channel if the header contains a first tag and to a second Ethernet channel if the header contains a second tag; and directing the control packets into a supervisory channel that is different from the first Ethernet channel and the second Ethernet channel.

* * * * *